United States Patent Office 2,757,178
Patented July 31, 1956

2,757,178

CHLORO-PHTHALIDES

Brian L. Hutchings, Pearl River, and Samuel Gordon, Orangeburg, N. Y., assignors to American Cyanamid Company, New York, N. Y., a corporation of Maine No Drawing. Application May 3, 1952,
Serial No. 286,021

8 Claims. (Cl. 260—343.3)

This invention relates to a new class of phthalide compounds and methods of making the same. More particularly this invention relates to certain new mono-carboxylic acids containing a phthalide nucleus, and their patentable equivalents, for instance the amides and simple esters thereof.

The new compounds of this invention can be represented by the following general formula:

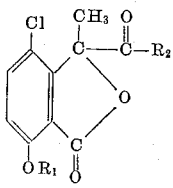

in which $R_1$ represents a hydroxy or alkoxy group and $R_2$ represents a hydroxy, alkoxy, aralkoxy, or $NH_2$ group. As will be obvious to those skilled in the art, when $R_2$ in the above formula represents a hydroxy group, the new compounds are free carboxylic acids; when $R_2$ represents a $NH_2$ group, the new compounds are the corresponding amides; and when $R_2$ represents an alkoxy or aryloxy group, the new compounds are esters. The new carboxylic acids of this invention react in a manner typical of carboxylic acids and the amides and simple esters can be prepared by the usual methods of amidation and esterification well known in the art. It is, therefore, intended that this invention cover the amides and the simple esters such as the lower alkyl esters, for instance the methyl and ethyl esters, and the aralkyl esters, for instance the benzyl esters. Of course, the new carboxylic acids of this invention undergo other typical reactions and may be readily isolated as their metallic salts, or they may be readily converted to the corresponding acid halides.

The new compounds of this invention are stable crystalline solids useful in many fields of organic chemistry. For instance, the new compounds can be employed as resin intermediates by a procedure comprising decarboxylation, oxidation with potassium permanganate and acidification in the presence of mangese dioxide whereby the corresponding chlori-phthalic anhydride is produced. However, it is not intended that such a procedure constitute a part of the present invention since some of the steps involved constitute the subject matter of other patent applications. Many of the new compounds also have antiseptic properties and may be employed in preparations prepared for this purpose.

While it is not intended that this invention be limited to new compounds of the above description when prepared by any one particular procedure, a new method of preparing the new class of compounds has been discovered and it is intended that this new method also constitute a part of the present invention. The new method of this invention comprises treating an alkylated chlortetracycline with a strong oxidizing agent at a neutral or alkaline hydrogen ion concentration in the presence of an inert solvent and at a temperature of from about room temperature to the reflux temperature of the reaction mixture.

Chlortetracycline is the generic form for "Aureomycin" a well known material produced by the fermentation of stretomyces aureofaciens in an appropriate culture medium, and is at present widely employed as an antibiotic and as an animal food supplement. Chlortetracycline is a chemical entity having an acidic hydroxy group which can be readily alkylated by the usual methods of alkylating acidic hydroxy groups. For instance, the hydroxy group in chlortetracycline can be conveniently alkylated by heating the same with an alkyl sulfate in aqueous solution. Detailed procedures for this alkylation step are set forth in the examples to follow. Chlortetracycline having its hydroxy group transformed to an alkoxy group constitutes the starting material for the new process of this invention and is referred to in this specification and claims simply as "alkylated chlortetracycline."

The new reaction of this invention is preferably performed in aqueous solution although other inert solvents can be employed in place of, or in addition to an aqueous solvent. For instance, one can employ acetone, dioxane, or tetrahydrofuran as the only solvent, or in combination with an aqueous solvent. Since, however, the strong oxidizing agents are more satisfactorily employed in aqueous solution, the use of organic solvents is not ordinarily advantageous.

Any of the common strong oxidizing agents may be employed in the new reaction of this invention. The preferred strong oxidizing agent is potassium permanganate, since it is readily available and since it results in a very convenient method of operation. However, other strong oxidizing agents, for instance potassium dichromate, also give satisfactory results in most instances. The strong oxidizing agent is employed in at least stoichometrical quantities and preferably in a large excess of the calculated amount. With potassium permanganate the presence of an excess is readily apparent from the purple color of the solution.

It is an advantage of the new process of this invention that the new reaction can be performed at widely varying hydrogen ion concentrations. The new reaction is preferably performed at approximately a neutral pH, i. e., pH 7 to pH 8, but can be satisfactorily operated at much higher pHs and even in a concentrated sodium hydroxide solution. In other words, any pH of about pH 7 or above is satisfactory. Hydrogen ion concentrations of approximately pH 7 or pH 8 are advantageous since higher yields are obtained within these hydrogen ion concentrations and since the reaction is less vigorous. The new reaction of this invention is strongly exothermic and unless the reaction velocity is reduced by means of cooling, undue boiling of the reaction mixture results and therefore any operating condition which reduces the reaction velocity is much to be desired. To maintain the reaction mixture at a roughly neutral pH, a buffer salt such as magnesium sulfate can usually be employed to advantage since otherwise, as the reaction progresses, the reaction mixture becomes increasingly basic.

It is also an advantage of the new process of this invention that it may be performed within a very wide temperature range, and in fact, temperatures of from about 0° C. up to the reflux temperature of the reaction mixture are satisfactory. Since, however, some decomposition apparently takes place at temperatures above about 90° C., the reaction mixture should preferably be maintained below this temperature by cooling. On the other hand, to maintain temperatures below about 15° C. necessitates a very large amount of cooling and, therefore, temperatures from about 15° C. to 90° C. constitute a preferred range. As stated above, the reaction is strongly exothermic and since the reaction is accelerated by higher temperatures, some difficulty may be encountered in maintaining the temperatures within the preferred range if one allows the temperature to approach the upper limit of the preferred range during the first one or two hours of the reaction. Therefore, it is usually advantageous to maintain the temperature during the first hours of the reaction at below about 40° C., after which time it can be allowed to rise to the upper part of the preferred range without undue danger of becoming uncontrollable. It should also be mentioned that the reaction is more vigorous at highly alkaline hydrogen ion concentrations, and therefore if the reaction is being performed at an alkaline pH, additional care should be exercised to maintain the temperature at a low level during the first one or two hours of reaction. In fact, in alkaline oxidation, it will usually be found to be advantageous to maintain the temperature below about 20° C. or 30° C. during the first one or two hours of reaction.

Since the reaction is exothermic, the completion of the reaction is readily determined. In other words, the reaction is relatively complete when the temperature of the reaction no longer tends to rise. Since, however, there is practically no danger of decomposing the reaction products, it is usually advantageous to allow the reaction to continue at room temperature for several hours after the reaction ceases to be obviously exothermic. For instance, it has been found that slightly better yields are obtained if the reaction mixture containing an excess of permanganate is allowed to sit overnight at room temperature.

The invention will be more particularly illustrated by the following examples in which all parts are by weight unless otherwise indicated.

EXAMPLE I

*3 - Methyl - 4 - chloro - 7 - methoxyphthalide - 3 - carboxylic acid*

Two hundred grams of chlortetracycline in a solution of 750 g. of sodium carbonate and 5 L. of water were methylated with 1,350 ml. of methyl sulfate at 55° C.–65° C. over a period of 2½–3 hours. The mixture was cooled with ice to 25° C., 500 ml. of 10 N NaOH were added and then the mixture was oxidized by adding solid $KMnO_4$ until an excess of permanganate was present. During the oxidation the temperature was kept between 25° C.–30° C. by the addition of ice to the mixture. After 3–4 hours at 25° C.–30° C. the temperature of the reaction mixture was allowed to go up to 45° C.–50° C. for an additional 2 hours. The oxidation mixture was then stirred overnight at room temperature with excess $KMnO_4$. By morning the excess permanganate had been reduced, therefore, additional permanganate was added and the mixture heated for about an hour. When no permanganate remained, the mixture was acidified to pH 1 with 50% $H_2SO_4$. Much foaming occurred during this acidification. The pH was then brought to 10 with 40% NaOH solution and the $MnO_2$ was removed by filtration. The resulting deep amber solution, 16 L., was acidified to pH 1 with sulfuric acid, and was then extracted with 5 portions of ethyl acetate, totaling 13 L. The ethyl acetate extracts were combined and concentrated to 3–4 L. The ethyl acetate solution was then extracted with about 2 L. of pH 7 phosphate buffer (1 M). On acidification of the buffer phase to pH 1 with concentrated HCl, an oil separated and was removed. The aqueous phase was then extracted with three equal volumes of ethyl acetate and this extract was concentrated to dryness yielding an oily residue. The oily residue and the oil from above were combined, dissolved in ethyl acetate and concentrated to effect crystallization of an impurity. Treatment of a portion (1.5 g.) of the ethyl acetate supernatant with concentrated hydrochloric acid yield 300 mg. of crude solid material. Recrystallization of this material from ethanol-water gave white crystals of 3-methyl-4-chloro-7-methoxyphthalide-3-carboxylic acid.

EXAMPLE II

*3 - Methyl - 4 - chloro - 7 - methoxyphthalide - 3 - carboxylic acid*

Twenty grams of chlortetracycline hydrochloride was suspended in 100 ml. of water containing excess sodium carbonate. One hundred and fifteen milliliters of methyl sulfate was added and the reaction was run at 70° C.–80° C. in the presence of excess sodium carbonate. When only one phase remained, the solution was cooled to room temperature. Excess magnesium sulfate was added and then solid potassium permanganate. After one hour without heating the most vigorous part of the oxidation was over. The solution was then heated on the steambath for three hours in the presence of excess potassium permanganate. After destroying the excess permanganate with $NaHSO_3$, the solution was filtered, acidified to pH 1 with conc. HCl, and extracted twice with equal volumes of ethyl acetate. The combined ethyl acetate extracts were extracted with 200 ml. of pH 7 phosphate buffer (1 M). The pH 7 buffer was then acidified to pH 1 with conc. HCl and re-extracted twice with equal volumes of ethyl acetate. The ethyl acetate phase was concentrated to dryness. The residue was dissolved in 20 ml. of water. On standing crystals of 3-methyl-4-chloro-7-methoxyphthalide-3-carboxylic acid separated. These were collected and purified by recrystallization from ethanol-water.

EXAMPLE III

*3 - Methyl - 4 - chloro - 7 - hydroxyphthalide - 3 - carboxylic acid*

Two hundred milligrams of 3-methyl-4-chloro-7-methoxyphthalide-3-carboxylic acid was dissolved in 20 ml. of 45% HI and refluxed for 2 hours. The solution was cooled, diluted to 40 ml. with water and extracted three times with equal volumes of ethyl acetate. The ethyl acetate extracts were combined and washed with a small portion of sulfurous acid to remove residual traces of $I_2$. The ethyl acetate extracts were concentrated to dryness. The residue was taken up in pH 7 phosphate buffer (1 M), the buffer acidified to pH 1 with conc. HCl, and then extracted with 2–3 volumes of ethyl acetate. The ethyl acetate solution was then dried and concentrated to dryness. The residue was crystallized three times from the minimum amount of water to yield about 95 mgs. of 3-methyl-4-chloro-7-hydroxyphthalide-3-carboxylic acid.

EXAMPLE IV

*Ethyl ester of 3-methyl-4-chloro-7-methoxyphthalide-3-carboxylic acid*

One hundred milligrams of 3-methyl-4-chloro-7-methoxyphthalide-3-carboxylic acid was dissolved in 20 ml. of absolute ethanol containing 5 drops of concentrated $H_2SO_4$. The solution was refluxed 2 hours and then allowed to stand overnight. The solution was then concentrated to about 0.5 ml. and 10 ml. of pH 7.0 phosphate buffer (1 M) was added, resulting in a precipitate of the crude ester. The ester was extracted into ethyl acetate, the ethyl acetate removed in vacuo and the resulting residue of crude ester purified by crystallization from alcohol-water.

EXAMPLE V

*Amide of 3 - methyl - 4-chloro-7-methoxyphthalide-3-carboxylic acid*

To a solution of about 150 mg. of crude ethyl ester of 3-methyl - 4 - chloro - 7 - methoxyphthalide-3-carboxylic acid in 10 ml. of ethanol-ammonia (saturated at 4° C.), was added 500 mg. of powdered ammonium carbonate. The reaction mixture was left in a stoppered tube at room temperature for six days. After this time the contents of the tube were heated on the steambath for one hour to evaporate some of the alcohol. The solution was then concentrated to dryness under vacuo. The residue was dissolved in about 75 ml. of methanol; this solution was evaporated to 40 ml. and then 40 ml. of hot water was added. On standing about 123 mg. of the amide was obtained.

EXAMPLE VI

*Methylation of 3-methyl-4-chloro-7-hydroxyphthalide-3-carboxylic acid*

3-methyl-4-chloro-7-hydroxyphthalide - 3 - carboxylic acid was dissolved in 5 ml. of $Na_2CO_3$ solution and treated dropwise with 2 ml. of methyl sulfate at 40° C.–50° C. The pH was maintained at 8–9 by the addition of sodium carbonate. A crystalline precipitate developed during the methylation. At the end of the reaction, the solution was diluted with pH 7.0 phosphate buffer (1 M) and then extracted with several volumes of ethyl acetate. The ethyl acetate extracts were washed with pH 7.0 phosphate buffer (1 M) and then concentrated. The resulting residue of the methyl ester of 3-methyl-4-chloro-7-methoxyphthalide-3-carboxylic acid was crystallized from methanol-$H_2O$ to yield 86 mgs. of purified material.

EXAMPLE VII

*Methyl ester of 3-methyl-4-chloro-7-methoxyphthalide-3-carboxylic acid*

3 - methyl - 4-chloro-7-methoxyphthalide-3-carboxylic acid (100 mgs.) was refluxed with methanol (15 ml.) and conc. sulfuric acid (3 drops) for three hours. The solution was evaporated to half volume, and 10 ml. of pH 7 phosphate buffer (1 M) and 5 ml. of water added. The solution was then extracted with ethyl acetate. The ethyl acetate phase was washed with sodium carbonate solution, dried, and evaporated to an oily residue. This residue of the methyl ester of 3-methyl-4-chloro-7-methoxyphthalide-3-carboxylic acid was then purified by crystallization from methanol-water.

The new compounds of this invention can also be prepared by the methods disclosed in copending U. S. application S. N. 286,034 filed concurrently herewith.

We claim:

1. Compounds selected from the group consisting of carboxylic acids represented by the formula:

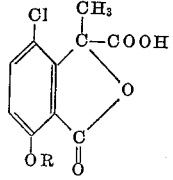

wherein R represents a substituent selected from the group consisting of hydrogen and lower alkyl radicals, the lower alkyl esters of said carboxylic acids and the unsubstituted carboxamides of said carboxylic acids.

2. The 3-methyl-4-chloro-7-(lower alkoxy)phthalide-3-carboxylic acids.

3. The new compound 3-methyl-4-chloro-7-methoxyphthalide-3-carboxylic acid.

4. The new compound 3-methyl-4-chloro-7-hydroxyphthalide-3-carboxylic acid.

5. The lower alkyl esters of the 3-methyl-4-chloro-7-(lower alkoxy)phthalide-3-carboxylic acids.

6. The methyl ester of 3-methyl-4-chloro-7-methoxyphthalide-3-carboxylic acid.

7. The ethyl ester of 3-methyl-4-chloro-7-methoxyphthalide-3-carboxylic acid.

8. The new compound 3-methyl-4-chloro-7-methoxyphthalide-3-carboxamide.

No references cited.